Feb. 21, 1956 H. B. BARRETT 2,735,601
HYDRAULIC BRAKE SERVICING EQUIPMENT
Filed May 27, 1955 3 Sheets-Sheet 1

INVENTOR.
HARRY B. BARRETT
BY *Alfred Petchaft*
ATTY.

Feb. 21, 1956  H. B. BARRETT  2,735,601
HYDRAULIC BRAKE SERVICING EQUIPMENT

Filed May 27, 1955  3 Sheets-Sheet 2

*INVENTOR.*
HARRY B. BARRETT
BY
ATTY.

Feb. 21, 1956 H. B. BARRETT 2,735,601
HYDRAULIC BRAKE SERVICING EQUIPMENT
Filed May 27, 1955 3 Sheets-Sheet 3

*INVENTOR.*
HARRY B. BARRETT
BY
ATTY.

United States Patent Office 2,735,601
Patented Feb. 21, 1956

2,735,601

HYDRAULIC BRAKE SERVICING EQUIPMENT

Harry B. Barrett, Clayton, Mo.

Application May 27, 1955, Serial No. 511,669

8 Claims. (Cl. 226—113)

This invention relates in general to certain new and useful improvements in hydraulic brake servicing equipment and, more particularly, to a tank-filling cap adapted for use in putting hydraulic fluid into the master cylinder reservoir of hydraulic brake systems.

In servicing hydraulic brake systems, it is frequently necessary to introduce fluid into the master cylinder reservoir. Such reservoirs are ordinarily vented to atmosphere and are so designed that a predetermined air space is maintained in the top of the reservoir between the surface of the fluid and the cap or closure. Therefore, the reservoir must be filled only to such level as will afford the requisite air space. These reservoirs are ordinarily filled under pressure and, therefore, it is difficult to accomplish the filling operation accurately and efficiently.

It is, therefore, an object of the present invention to provide a cap adapted for use in filling hydraulic brake systems, which cap can be installed and removed very quickly and conveniently and will afford the requisite amount of air space above the fluid when removed after the filling operation has been completed.

It is a further object of the present invention to provide a filling cap of the type stated which is provided with means to permit air to bleed out of the master cylinder reservoir as it is being filled so that the fluid will not have any entrained air bubbles and so that the above-mentioned volumetric relationship will be accurately preserved.

It is another object of the present invention to provide a filling cap of the type stated which will catch any excess fluid running out of the air-bleeding clearance or opening and thereby prevent such excess from spilling over onto the adjacent mechanism of the brake system or of the automobile.

It is another object of the present invention to provide a filling cap of the type stated which is adapted to fit the various master cylinder reservoirs commonly employed in the hydraulic brake systems of automobiles and in that sense may be said to be "universal."

With the above and other objects in view, my invention resides in the novel features of form, construction, arrangement, and combination of parts presently described and pointed out in the claims.

In the accompanying drawings (three sheets)—

Figure 1:
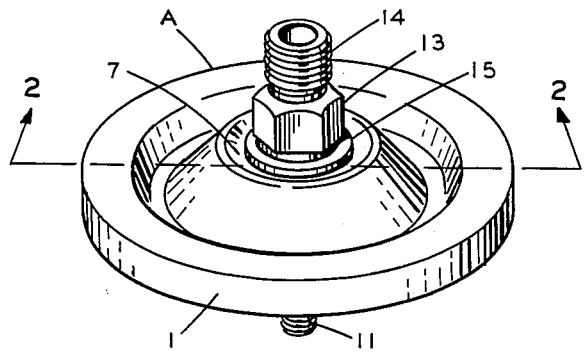
Figure 1 is a perspective view of a filling cap constructed in accordance with and embodying the present invention.
Figure 2:
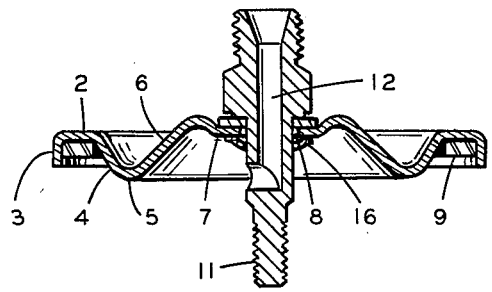
Figure 2 is a sectional view taken along line 2—2 of Figure 1.

Referring now in more detail and by reference characters to the drawings, which illustrate practical embodiments of the present invention, A designates a filling cap comprising a circular cover or closure element 1 stamped, spun, or otherwise formed preferably from heavy-gauge sheet metal and having a relatively wide flat annular rim 2 having a downwardly turned annular flange 3. The rim 2, on its interior margin, merges into an oblique downwardly deflected flange 4 which is interiorly adjoined to a flat bottom portion 5, the latter being, in turn, interiorly adjoined to a relatively wide, upwardly converging frusto-conical collar 6, which is rounded over annularly around its upper margin forming an annular dome and merges into a downwardly dished flat central collar 7 having a concentric aperture 8. Cemented or otherwise securely seated upon the under face of the rim 2 between the flanges 3, 4, is a relatively wide annular gasket 9 formed of cork, neoprene, or any other suitable gasketing material which is substantially inert to hydraulic brake fluids.

Disposed loosely through the aperture 8 is a tubular stem 10, the lower end of which is turned down and threaded to form an attachment stud 11. The stem 10 is, furthermore, axially bored from its upper end downwardly and radially inwardly from the side just above the stud 11 to provide a fluid injection passage 12. At its upper end, the stem 10 is diametrally enlarged and machined in the provision of a nut-portion 13 and outwardly thereof is turned down and threaded to form an attachment nipple 14. Interposed between the under face of the nut-portion 13 and the central collar 7 is a washer 15 and on the other side of the collar 7 is a so-called speed-nut or spring-tensioned friction fastener 16 which holds the closure element 1 and stem 10 together as a unit. Since the stem 10 fits through the aperture 8 loosely, there is an annular clearance space $s$ through which air can escape as will be presently more fully described.

Figure 3:
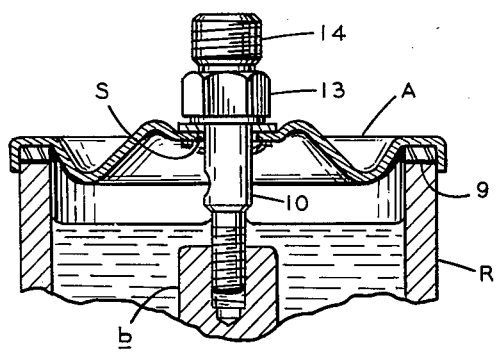
Figure 3 is a sectional view similar to Figure 2, showing the filling cap in operative position on a master cylinder reservoir.

In use, the filling cap A is placed over the open upper end of a hydraulic fluid reservoir R and the attachment stud 11 is screwed into the cover-retaining boss $b$, substantially as shown in Figure 3. The filling cap A is drawn down tightly so that the gasket 9 effects a seal. Thereupon, a conventional hose fitting and hose are connected to the nipple 14 so that the hydraulic brake fluid can be introduced under pressure and the displaced air will escape through the clearance space $s$. Since the filling cap A is contoured so as to dip down into the reservoir R, the fluid may be injected until fluid, rather than air, begins to ooze out of the clearance space $s$. When this occurs, it will be apparent that the filling operation has been completed. Due to the unique shape of the cap A, any such excess fluid will be caught in the trough formed between the flange 4 and the collar 6. Furthermore, when the filling cap A is removed, the volumetric displacement thereof is such that the fluid will flow out into a level surface leaving substantially the requisite clearance to the top of the reservoir R, the amount of liquid held up under the collar 6 being sufficient to compensate for the displacement of the immersed portion of the stem 10. It should also be noted that the rim 2 is wide enough to accommodate various diameters within reasonable limits. For purposes of illustration, the reservoir R, as shown, has very thick walls, but most reservoirs, in actual use, have thinner walls and vary somewhat in diametral dimensions. The change in diametral size does not impair the volumetric relationships above-mentioned because, if the inside diameter is larger, more fluid is entrapped under the rim 2 and oblique flange 3 and this substantially compensates for the larger volume of fluid required by a reservoir having a larger inside diameter.

Figure 4:
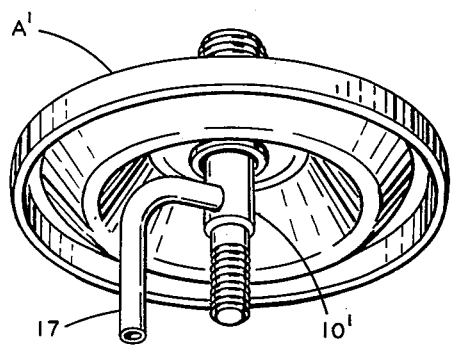
Figure 4 is a perspective view of a modified form of filling cap also constructed in accordance with and embodying the present invention.
Figure 5:
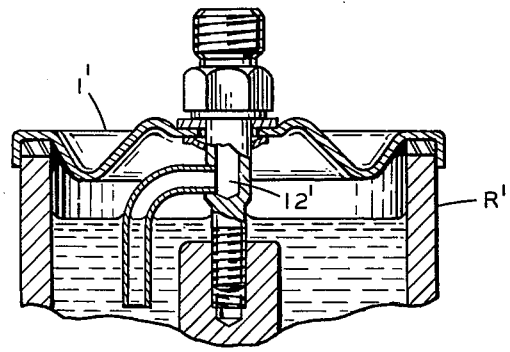
Figure 5 is a vertical sectional view of the modified form of filling cap in operative position on a master cylinder reservoir.

It is also possible to provide a modified form of filling cap A' as shown in Figures 4 and 5. This filling cap A' is substantially identical with the previously described cap A having a closure element 1' like the closure element 1 and a stem 10' substantially similar to the stem 10, except that it has a fluid injection passage 12' which is provided at its lower end with a laterally projecting L-shaped outlet pipe 17 which dips down into the fluid already in the reservoir R', as shown in Figure 5, to prevent foaming and air-entrainment where the reservoir is deep or the fluid level abnormally low.

Figure 6:
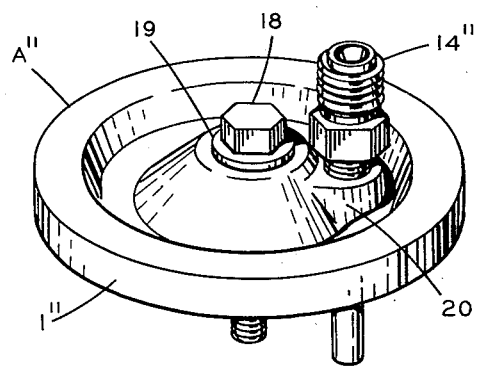
Figure 6 is a perspective view of a further modified form of filling cap also constructed in accordance with and embodying the present invention.
Figure 7:
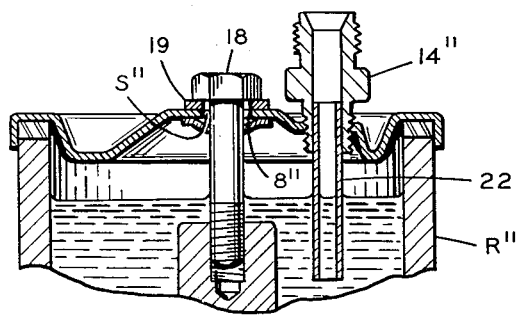
Figure 7 is a vertical sectional view of the further modified form of filling cap in operative position on a master cylinder reservoir.

It is also possible to provide a further modified form of filling cap A", as shown in Figures 6 and 7. This filling cap A" is substantially similar to the previously described filling cap A, having a closure element 1" of substantially the same shape and contour of the closure element 1 and centrally provided with a concentric aperture 8" for receiving a cap screw 18 and washer 19 by which the cap A" is secured in operative position upon the master cylinder reservoir R". The aperture 8" is substantially larger in diametral size than the shank of the cap screw 18 to provide an air-venting passage or clearance space s", which serves the same purpose as the previously described clearance space s. In radially outwardly spaced relation to the aperture 8" the cap A" is upset or formed with a protuberance 20 having a flat top land into which an attachment nipple 14" is conventionally threaded. The attachment nipple 14" is, furthermore, provided in its lower end with a downwardly projecting tubular extension 22 which dips into the fluid already in the master cylinder reservoir R", as shown in Figure 7.

It should be understood that changes and modifications in the form, construction, arrangement, and combination of the several parts of the hydraulic brake servicing equipment may be made and substituted for those herein shown and described without departing from the nature and principle of my invention.

Having thus described my invention, what I claim and desire to secure by Letters Patent is:

1. A filling cap for the filling opening in a fluid reservoir of an hydraulic brake system, said filling cap comprising a closure member sized to fit upon and extend closurewise across said filling opening, said member having an annular rim adapted to be seated upon said reservoir, a stem mounted in and extending through said member and provided on one end with means for connection with a supply of brake fluid under pressure and being adapted on its other end to dip down into the reservoir for immersion in the fluid when the reservoir is fully filled, means externally of the filling stem forming a leak port through the member to permit displaced air and excess fluid to escape from the reservoir as the reservoir is being filled, said closure member being dished downwardly in that portion of its area lying within the rim and relative thereto to provide a formed portion which dips down into the fluid when the reservoir has been fully filled through said stem and with said filling cap in place on the reservoir, said formed portion together with the immersed portion of the stem, when the filling cap and stem are in operative position on the reservoir, being of such size and shape as to effect a volumetric displacement of fluid which, taken together with the volumetric displacement of the immersed end of the stem, will leave a net volumetric displacement of fluid in the reservoir so that upon removal of said filling cap the level of fluid left in the reservoir will be slightly below the level of the reservoir by a predetermined amount whereby to create a predetermined air space between said fluid level and the upper margin of the reservoir, and means operatively associated with the filling cap and projecting in position to extend in the reservoir for coupling connection with an element within the reservoir to hold the filling cap detachably thereon.

2. A filling cap for the filling opening in a fluid reservoir of an hydraulic brake system, said filling cap comprising a closure member sized to fit upon and extend closurewise across said filling opening, said member having an annular rim adapted to be seated upon said reservoir, a tubular filling stem mounted in and extending through said member, said stem being provided on one end with means for connection with a supply of brake fluid under pressure and being adapted on its other end to dip down into the reservoir for immersion in the fluid when the reservoir is fully filled, means externally of the filling stem forming a leak port through the member to permit displaced air and excess fluid to escape from the reservoir as the reservoir is being filled, means for holding the cap in operative position on the reservoir, said closure member being dished downwardly in that portion of its area lying within the rim and relative thereto to provide a formed portion which dips down into the fluid when the reservoir has been fully filled through said stem with said filling cap in place on the reservoir, said formed portion together with the immersed portion of the stem, when the filling cap and stem are in operative position on the reservoir, being of such size and shape as to effect a volumetric displacement of fluid which, taken together with the volumetric displacement of the immersed end of the stem, will leave a net volumetric displacement of fluid in the reservoir so that upon removal of said filling cap the level of fluid left in the reservoir will be slightly below the upper margin of the reservoir by a predetermined amount whereby to create a predetermined air space between said fluid level and the upper margin of the reservoir, and means operatively associated with the filling cap and projecting in position to extend in the reservoir for coupling connection with an element within the reservoir to hold the filling cap detachably thereon.

3. A filling cap for the filling opening in a fluid reservoir of an hydraulic brake system, said filling cap comprising a closure member sized to fit upon and extend closurewise across said filling opening, said member having an annular rim adapted to be seated upon said reservoir, a tubular filling stem mounted in and extending through said member with sufficient clearance to form a loose fit directly in said member forming a leak port therebetween within the cap and to permit displaced air and excess fluid to escape from the reservoir as said reservoir is being filled, said stem being provided on one end with means for connection with a supply of brake fluid under pressure and being adapted on its other end to dip down into the reservoir for immersion in the fluid when the reservoir is fully filled, means on the last-mentioned end for engaging an element within the reservoir to hold the cap in place thereon, said closure member being dished downwardly in that portion of its area lying within the rim and relative thereto to provide a formed portion which dips down into the fluid when the reservoir has been fully filled through said stem with said filling cap in place on the reservoir, said formed portion being of such size and shape as to effect a volumetric displacement of fluid which, taken together with the volumetric displacement of the immersed end of the stem, will leave a net volumetric displacement of fluid in the reservoir so that upon removal of said filling cap the level of fluid left in the reservoir will be slightly below the upper margin of the reservoir by a predetermined amount whereby to create a predetermined air space between such fluid and the upper margin of the reservoir.

4. A filling cap for the filling opening in a fluid reservoir of an hydraulic brake system, said filling cap comprising a closure member sized to fit upon and extend closurewise across said filling opening, said member having an annular rim adapted to be seated upon said reservoir, a tubular filling stem mounted in and extending through said member with sufficient clearance to form a leak port within the cap and to permit displaced air and excess fluid to escape from the reservoir as said reservoir is being filled, said stem being provided on one end with means for connection with a supply of brake fluid under pressure and being adapted on its other end to dip down into the reservoir for immersion in the fluid when the reservoir is fully filled, means on the last-mentioned end for engaging the reservoir to hold the cap in place thereon, said closure member having a downwardly deflected flange extending from the interior margin of the rim and merging into an upwardly converging collar adjacent the center of the cap, said collar forming an inner annular dome-like portion in the cap above the bottom of the flange, and the downwardly deflected flange dipping downwardly into the fluid when the reservoir has been fully filled through said stem with said filling cap in place on the reservoir, said dome-like portion in the collar having a volume less than the volumetric displacement of fluid by the deflected flange taken together with the immersed portion of the stem so that, upon removal of said filling cap, the level of fluid left in the reservoir will be slightly below the upper margin of the reservoir.

5. A filling cap as defined in claim 1, wherein the stem is tubular and has a lateral opening below the closure member and above the upper end thereof for supplying fluid therethrough to the reservoir.

6. A filling cap as defined in claim 1, wherein the stem is tubular, and an extension tube connected with the tubular stem and dipping down into the liquid within the reservoir.

7. A filling tube as defined in claim 1, wherein the stem is eccentric of the axis of the filling cap, and attachment means separate from the stem for mounting the cap in seated position upon the reservoir.

8. A filling cap for the filling opening in a fluid reservoir of an hydraulic brake system, said filling cap comprising a closure member sized to fit upon and extend closurewise across said filling opening, said member having an annular rim adapted to be seated upon said reservoir, a tubular filling stem mounted in and extending through said member with sufficient clearance to form a leak port within the cap and to permit displaced air and excess fluid to escape from the reservoir as said reservoir is being filled, said stem being provided on one end with means for connection with a supply of brake fluid under pressure and being adapted on its other end to dip down into the reservoir for immersion in the fluid when the reservoir is fully filled, said closure member having a downwardly deflected flange extending from the interior margin of the rim and merging into an upwardly converging collar adjacent the center of the cap, said collar forming an inner annular dome-like portion in the cap above the bottom of the flange, and the downwardly deflected flange dipping downwardly into the fluid when the reservoir has been fully filled through said stem with said filling cap in place on the reservoir, said dome-like portion in the collar having a volume less than the volumetric displacement of fluid by the deflected flange taken together with the immersed portion of the stem so that, upon removal of said filling cap, the level of fluid left in the reservoir will be slightly below the upper margin of the reservoir and means for securing the filling cap upon the reservoir.

References Cited in the file of this patent

UNITED STATES PATENTS

| | | |
|---|---|---|
| 1,192,134 | Stevens | July 25, 1916 |
| 1,712,977 | Bohnhardt | May 14, 1929 |
| 1,759,734 | Davenport | May 20, 1930 |
| 1,883,880 | Cole | Oct. 25, 1932 |
| 2,078,567 | Foregger | Apr. 27, 1937 |
| 2,167,123 | Meyer | July 25, 1939 |
| 2,287,806 | Kamrath | June 30, 1942 |
| 2,403,030 | Solinsky | July 2, 1946 |
| 2,545,233 | Kaufman | Mar. 13, 1951 |
| 2,628,741 | Wilds | Feb. 17, 1953 |
| 2,693,418 | Smith | Nov. 2, 1954 |

FOREIGN PATENTS

| | | |
|---|---|---|
| 20,865 | Germany | Feb. 22, 1883 |
| 995,099 | France | Aug. 14, 1951 |